UNITED STATES PATENT OFFICE.

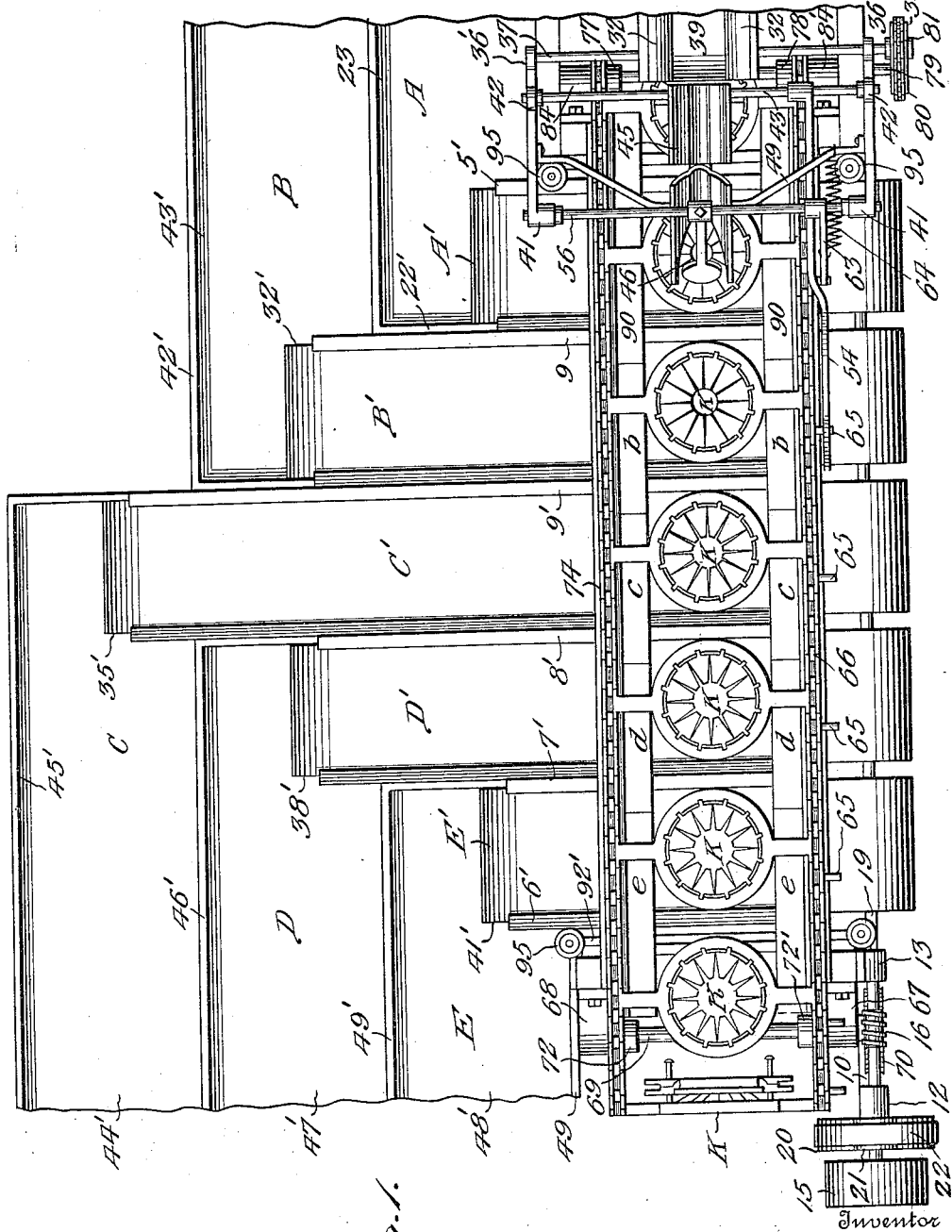

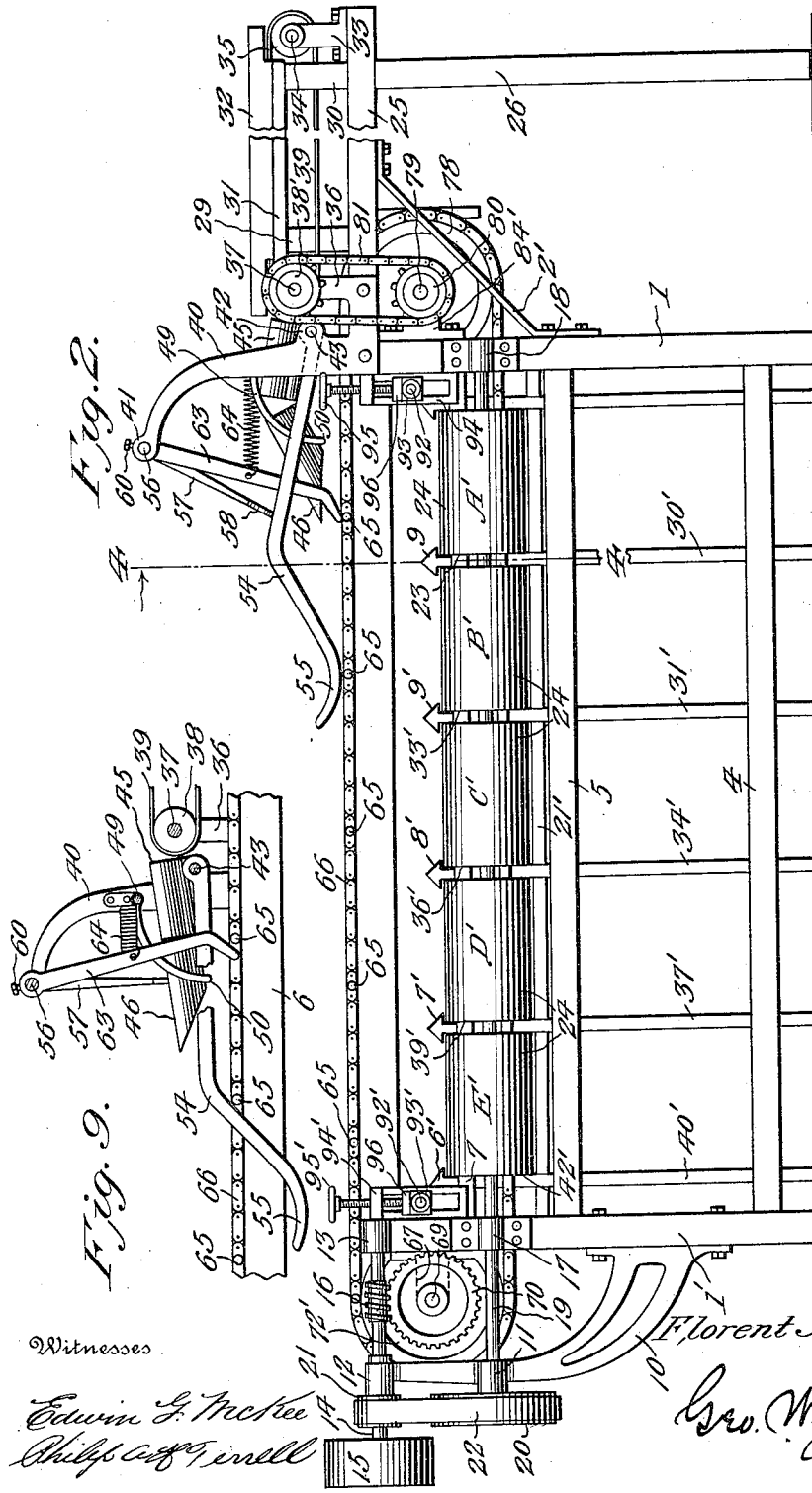

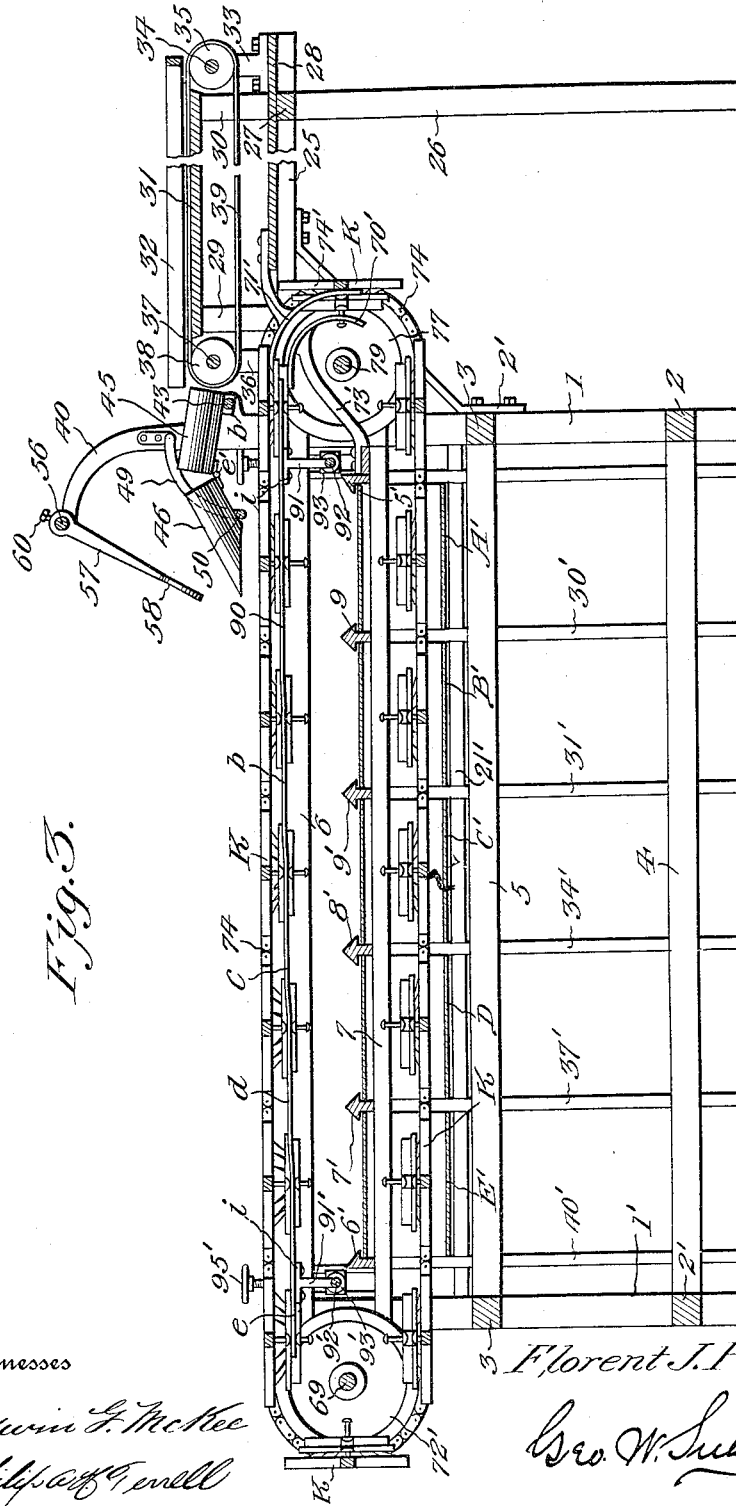

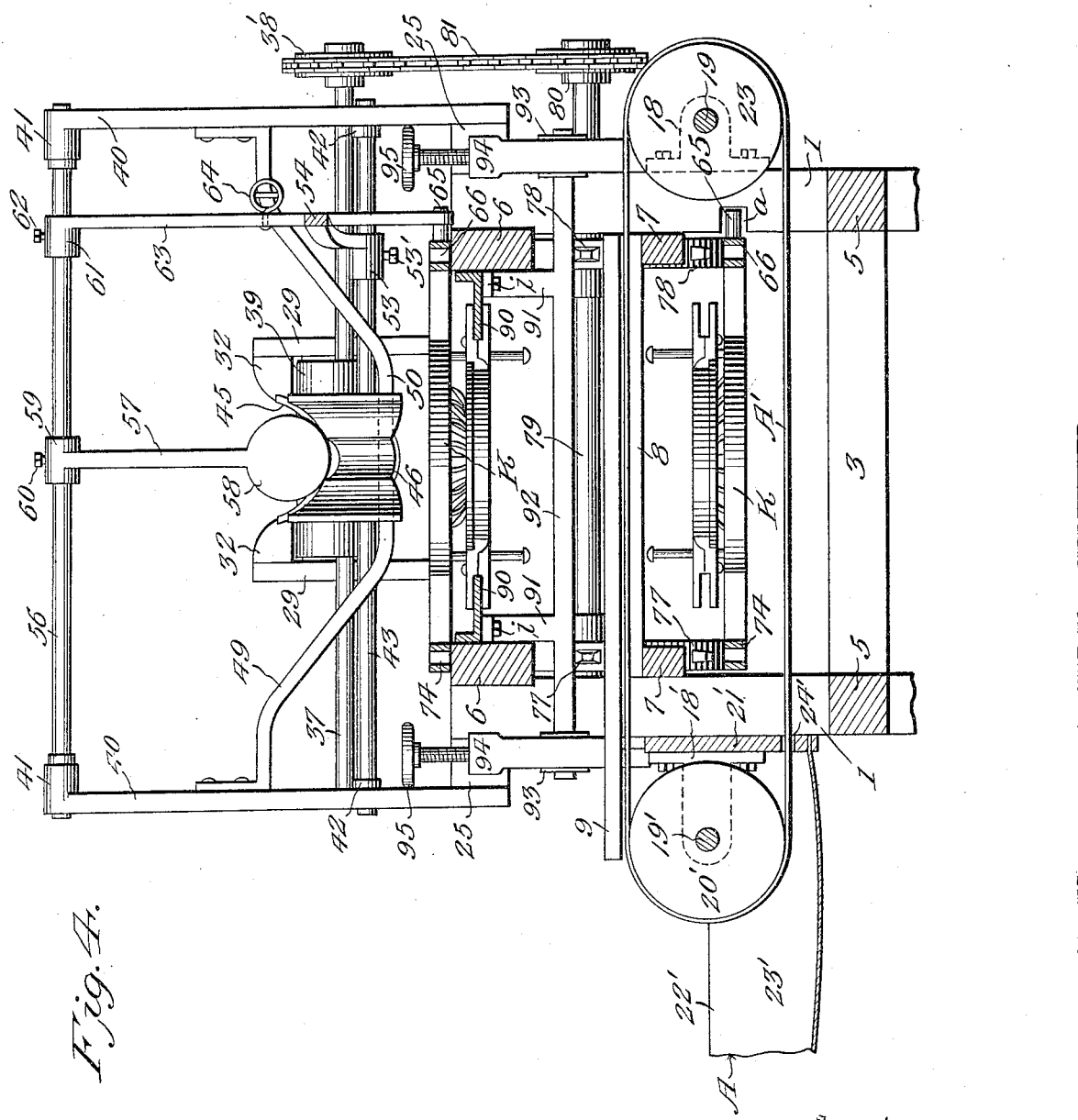

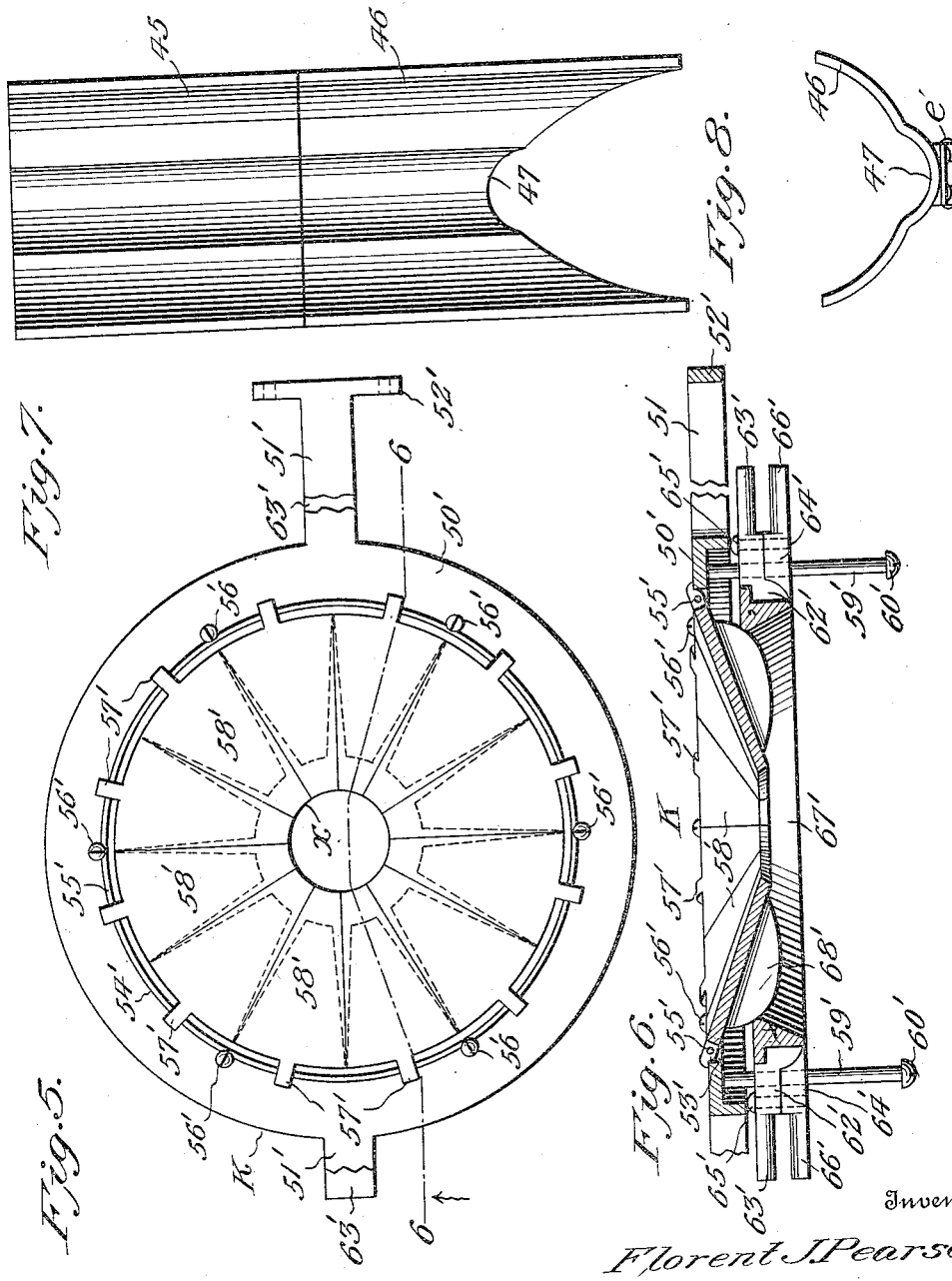

FLORENT J. PEARSON, OF PAONIA, COLORADO, ASSIGNOR TO OREGON FRUIT CLEANER COMPANY, OF THE DALLES, OREGON, A CORPORATION OF OREGON.

FRUIT-SIZER.

1,175,984.            Specification of Letters Patent.      Patented Mar. 21, 1916.

Application filed May 3, 1912. Serial No. 694,968.

*To all whom it may concern:*

Be it known that I, FLORENT J. PEARSON, a citizen of the United States, and a resident of Paonia, in the county of Delta and State of Colorado, have invented certain new and useful Improvements in Fruit-Sizers, of which the following is a specification, reference being had to the accompanying drawings.

This invention has relation to certain new and useful improvements in machines employed in sizing fruit.

The object of my invention is to provide a sizing machine including a series of traveling fruit holders into which the fruit drops, one at a time, the holders successively expanding to permit the fruit to escape at different places according to its size, and embodying various novel ideas. In carrying out this object I have provided sectional pockets together with means for altering the relative positions of the sections to expand and contract the pockets, and in the best mode which I have devised for accomplishing this, I have arranged sectional cups and gages in pairs, between the members of which relative movement occurs, as the pairs travel together through the machine, the outlet openings of the cups increasing in size during said travel. While any desired means for receiving the fruit may be employed, I prefer to associate with the grading mechanism conveyer belts each receiving fruit of a given size from the grading mechanism and delivering it to distinct desired locations, where the fruit can be sorted by hand and classified as to color and blemish.

Another object is to provide a machine of this general character of a simple and inexpensive nature and of a compact and durable construction arranged so that the sorting basket operating mechanism can be readily changed, permitting different kinds of fruit, such as peaches, oranges or apples being accurately graded, according to size.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which like numerals of reference indicate similar parts in the several views: Figure 1, is a plan of a machine embodying my invention with portions broken away. Fig. 2, is a side elevation with parts broken away. Fig. 3, is a lengthwise section, with parts broken away. Fig. 4, is a section on line 4, 4, of Fig. 2. Fig. 5, is a plan view of one of the sorting baskets with parts broken away. Fig. 6, is a section on line 6, 6 of Fig. 5. Fig. 7, is an enlarged detached plan of the rocking hopper as employed in my invention. Fig. 8, is an end view of Fig. 7. Fig. 9, is a fragmentary detail disclosing the rocking hopper in one of its extreme positions.

In the machine illustrated, which is one of the various possible embodiments of my invention, I employ a supporting standard including four similar posts 1, 1'. These posts are connected by means of the lower cross braces 2, 2, shown in Fig. 2, the upper cross braces 3, 3, and the side bars 4 and 5, to provide a rectangular standard. To the posts 1, 1' are secured the two upper frame bars 6, 6, these being shown in cross section in Fig. 4. Secured in parallel spaced relation below the upper frame bars 6, 6, are the supporting bars 7, 7, shown in Figs. 2, 3 and 4. Fixed transversely to the supporting bars 7, as shown in Fig. 4, are the bars used to guide the aprons. Each of these bars has a base portion 8, as shown in Fig. 4, by means of which the bars are secured to the frame members 7. From each base extends a slotted belt guide having an inverted V-shaped upper end. It is below the inverted V-shaped upper ends of these bars that the conveyer belts are guided as it clearly disclosed in Fig. 3. These bars extending laterally beyond one side of the frame and being of various lengths as shown in Fig. 1. Secured to the end posts 1', 1', at the foot of the machine, are the two bearing brackets 10, clearly shown in Fig. 2, each having an intermediately positioned bearing 11, and an upper bearing 12. Held in alinement with the upper bearing 12, and fixed to one of the posts 1', is the bearing 13, and revolubly held within these bearings 12 and 13, is the drive shaft 14, having a drive pulley 15, and a worm 16. Secured in alinement with the bearing 11, is the bearing 17, secured to one of the posts 1', below the bearing 13, while fixed to the post 1, upon the same side at the opposite end, is the bearing 18, and held within these bearings 11, 17 and 18, is the drum shaft 19, having the pulley 20, over which passes a suitable belt 22, which also passes over the pulley 21, keyed to the drive shaft 14, so that these shafts 14 and 19, are brought into proper belt connections to be simultaneously driven.

Extending from the head of the machine are the side bars 25, which at their ends are supported by means of the standards 26, and braced by means of the brace bar 2'. Secured to the side bars 25, as shown in Fig. 3, is a table 28, and extending from this table as shown are the stub posts 29 and 30, which support the skirt or platform 31. Secured to the ends of this skirt 31, are the flanges 32. Extending from the outer end of the table 28, are the two bearing posts 33, 33, giving support to the drum shaft 34, carrying the drum 35. Secured to the side members 25, are the bearing standards 40, each standard at its upper end terminating in the bearing 41, while near the lower end each standard 40, has a bearing eye 42, while extending from the base portion of each bearing standard 40, is the bearing post 36 in alinement with the bearing post 33, this construction being illustrated in Figs. 2 and 3. Revolubly held within the bearings 36' shown in Fig. 1, of the posts 36, is the drum shaft 37, this drum shaft carrying the drum 38, and at its outer end having a chain sprocket 38'. Passing over the drums 35, and 38, is the endless preferably fabric feed belt 39, which passes over the platform 31.

The novel feeding means adapted to receive fruit from the belt 39 or otherwise and constructed and arranged to act in timed relation with the grading part of the machine will now be described. I do not however claim this feeding means or the combination thereof with the grading means in this application. Held within the bearings 42, of the standards 40, is the rock shaft 43, shown in Fig. 4, to which is secured the rear tilting hopper 45. As shown in Fig. 3, this hopper has a lug $b$, through which the rock shaft 43, passes so that this hopper 45, is securely fastened to the shaft 43. Secured to the tilting hopper 45, by means of the hinge $e'$, is the forward rocking hopper 46, this hopper normally resting and sliding upon the portion 50, of the yoke bar 49, this yoke bar having its ends secured to the standards 40, as shown in Fig. 4. Secured to the rock shaft 43, by means of the sleeve 53, shown in Fig. 4, is the trip lever 54, having curved end 55, this construction being shown in Figs. 2 and 9. A rocking motion is imparted to the shaft 43, by means of this lever 54, which is adjustably secured to the shaft 43, by means of the set screw 53', shown in Fig. 4. Secured to the rock bar 56, which is revolubly held within the bearings 41, is the spring actuated trip arm 63, having a sleeve 61, provided with the set screw 62, so that this trip arm can also be adjustably secured to the rock bar 56. Immediately above the tilting hopper 46, is the stop blade 58, forming a part of the stem 57, having the sleeve 59, carrying the set screw 60, so that this stop blade 58, may be given adjustment. As shown in Fig. 4, a spring 64, has one end secured to the trip arm 63, while the remaining end is secured to the yoke 49. The lower bent end of this trip arm is held in the path of the studs 65, which project outward from the chain 66. This chain 66 is part of the support for the fruit holders and belongs to the grading mechanism. Preferably, but not necessarily, this support is a flexible endless carrier and I have found it convenient, as in the machine illustrated in the drawings, to employ two parallel chains. The chain 66, as well as the opposite chain 74, passes at one end over the chain sprockets 78 and 77, shown in Fig. 4, and at the opposite end over the chain sprockets 73, and 72', shown in Figs. 3 and 2. The chain sprockets 77, and 78, are secured to the sprocket shaft 79. The sprocket shaft 69, is held within the bearings 67 and 68, shown in Fig. 1, while the shaft 79, is held within the bearings 84 and 84' also shown in Fig. 1. The shaft 79, as shown in Fig. 2, at one end carries the chain sprocket 80, over which the chain 81, passes which also passes over the chain sprocket 38', secured to the shaft 37, this construction also being shown in Fig. 4.

Any suitable means for moving the support for the fruit holders may be used but I find that illustrated effective. Secured to one end of the shaft 69, as disclosed in Figs. 1 and 2, is the worm gear 70, the gear meshing with the worm 16, secured to the driving shaft 14. By means of this worm and gear a slow steady rotary movement is imparted to the shafts 69 and 79, which actuate the chains 66 and 74. These chains as shown in Fig. 4, slide upon the upper frame bars 6.

The cam construction now to be described is part of the means which I prefer for operating the fruit holders.

Secured to the inner faces of the upper frame bars 6, shown in Fig. 5, and held in parallel spaced relation, are the successive rails 90, including a series of sections of progressively greater distance from the upper edges of the upper frame bars 6, as will be understood in referring to Fig. 3. The rail series are marked $b$, $c$, $d$, and $e$, and are clearly shown in Fig. 1, in top view. These successive rails are secured to the upper flanges $i$, of the shaft arms 91, shown in Fig. 4, which arms extend from the shaft 92, at one end and the shaft 92', at the opposite end. In Fig. 2, both of these shafts are shown. At its ends the shaft 92, is held within the slide boxes 93, each of which has a head 96, within which are swiveled the lower ends of the adjusting screws 95. The screws 95, work within the upper ends of the slotted frames 94, secured to the posts 1, 1. The shaft 92', is provided with similar arms 91', shown in Fig. 3, having the securing flanges $i$, by means of which the arms 91', are secured to the last section $e$, of the successive rail. This shaft 92', is held within the bearing box 93', each of which also has a head 96, within which is swiveled the lower end of an adjusting screw 95', this construction also being shown in Fig. 2. By means of the screws 95 and 95', the successive rails may be raised and lowered.

While not essential to the operation of my grading mechanism, the fruit receiving and delivering means now to be described coöperates effectively therewith. In this connection it is noted that the term "bin" in certain of the claims covers conveyer belts or other means for receiving graded fruit and conserving the results of the grading. As shown in Fig. 4, secured to the posts 1 and 1', upon one side are the bearings 18'. These bearings are located near the head or receiving end of the machine and are secured to a panel 21', suitably fastened to one of the posts 1. These bearings 18', there being two such bearings, give support to a drum shaft 19' supporting a drum 20', a conveyer A', passing over the drums 20', and 23'. The conveyer A', passes below and is guided by means of the channel bars 5' and 9, as shown in Fig. 1. Held within the posts 30', shown in Fig. 2, is a shaft giving support to the drum 32', this drum being shown in Fig. 1, while secured in alinement with the drum 32', is the drum 33', fixed to the shaft 19, shown in Fig. 2, and passing over these drums is the endless conveyer B'. Revolubly held within bearings supported by the posts 31' and 34', is a suitable shaft supporting the drum 35', this drum being in alinement with the drum 36', secured to the shaft 19 an endless apron C', passing over these two drums. Revolubly held within the post 34', and a post 37', is the shaft supporting the drum 38', this drum being in alinement with the drum 39', the endless apron D', passing over these two last mentioned drums. Revolubly held within the post 37', and the post 40', is a suitable shaft giving support to the drum 41', in alinement with the drum 42', the endless conveyer E', passing over these last mentioned drums. The apron B', is guided below the flange bars 9 9', while the aprons C', D' and E', are guided respectively below the heads of the flange bars 9', 8', 7' and 6'. Extending from the supporting standards 1, are the battens 22', which form a support for the fabric bottom 23', to form a bin A. The endless conveyer A', empties into this bin A. Suitably secured below the endless conveyer B', is the bin B, comprising the skirting batten 42', to which is secured a fabric bottom 43'. The endless conveyer C', empties into a bin C, comprising a fabric bottom 44', and a skirting batten 45'. The endless conveyer D', empties into the bin D, including the batten 46', and the fabric bottom 47'. The endless conveyer E', empties into the bin E, comprising the fabric bottom 48', and the battens 49'. By means of this construction each conveyer empties into a separate bin.

The mechanism employed to sort the fruit is shown in detail in Figs. 5 and 6. In Figs. 1 and 3, the sorting baskets or fruit holders are generally indicated by the letter K. These fruit holders are carried by a movable supporting member, which may be a flexible endless carrier. I have made these holders in the form of cups with yielding sectional walls, and have provided the holders with supports to which depending, inwardly extending sections or fingers are movably secured. It is best to dispense entirely with springs or this may be done by overbalancing said fingers and sections outwardly so that the cups tend automatically to open by gravity, their outlets being variable and circular in form. Means for controlling the opening of the cups is provided and this cup adjusting means preferably takes the form of gages, each fruit holder being provided with a gage, between which and the corresponding fruit holder relative movement is possible. I prefer to construct the gages with holes, preferably round, into which the sections depend. I also provide means for causing the fruit holders with their gages to travel together through the machine, and means for causing relative movement between the members of said pairs. This last named means preferably takes the form of a cam rail or rails having stepped sections, which by coöperation with one of the members of said pairs enable the holders to open wider during their joint travel with the gages.

In the particular embodiment of my invention chosen for illustration each sorting basket comprises an annulus 50', having oppositely extending arms 51', each arm ending in a chain link 52'. These chain links form part of the driving chains 74 and 66, so that these sorting baskets form a part of the chains. Each annulus is provided with a circular groove 54', and a plurality of openings 53', these being shown in Fig. 6. Held by means of the screws 56', within the groove 54', is a circular bail 55', and pivotally held upon this bail 55', are a plurality of equi-formed sector shaped fingers 58', these fingers ending short of the center of the annulus so as to provide a suitable escape opening $x$. As shown in Fig. 6, the outer ends of the fingers 58', are splayed so that the fruit will readily drop through the opening $x$, and will not clog therein. Any suitable number of these sorting baskets K, are employed. Extending from the under surface of each annulus 50', are two oppositely positioned removable guide pins 59', each ending in a stop head 60', and slidably held upon these pins is a gage ring 67', which also has its inner surface splayed as clearly shown in Fig. 6. This gage ring is provided with the oppositely directed apertured ears 62', slidably held upon the pins 59', each ear carrying a screw 65', and ending in a trunnion 63'. Secured to the ears 62', are the ears 64', each ear being held to the adjacent ear by means of the screw 65', these detachable ears 64', also ending in a bearing trunnion 66'.

It will readily be apparent that the individual gages may be removed and others of different size substituted. To do this it is necessary to release the gages from the fruit holders, which may be done by unscrewing the guide pins 59', and also from the gage rails which may be done by removing the detachable ears 64'. Obviously the desired feature of interchangeability could be secured in various ways.

As shown in Fig. 6, each finger 58', has an arcuate rib 68' extending from the under surface and these ribs are arranged for co-action with the inner edge of the adjacent gage ring. In forcing the gage ring upward to its full limit as shown in Fig. 6, the fingers 58', are held in contact forming a conical member with a central opening $x$. As the gage ring 67', travels away from the fingers they drop so that opening gradually increases in diameter reaching its maximum when the gage ring rests upon the stop heads 60'. It is by means of this gage ring and the fingers that the opening is regulated within the baskets and the fruit is, of course, sized by means of these openings.

The successive rails can be given any desired adjustment by means of the screws 95 and 95', so that the fingers can be set to provide any desired size of opening at the point immediately above the fruit conveyer A'. It is upon this first conveyer A', that all under sized fruit drops to be conveyed into the bin A.

As the basket advances the second rail section $b$, is encountered which is slightly lower than the first section 90, resulting in the gage descending having a slight increase in the diameter of the opening formed within the bottom of the sorting basket so that the fruit within the basket, should it be of a size equal to the opening, will drop through the conveyer $b'$, to be deposited in the bin B. Should the fruit be of a size larger than the opening formed over the apron B', the fruit will remain in the basket. As the basket approaches the successive rail section $c$, a further dropping of the annulus results, again increasing the diameter within basket opening so that the fruit of a size corresponding to the opening will drop upon the endless conveyer C', or being still larger than the opening, will be carried over the apron D'. Any fruit remaining in the basket however, at this point will be deposited upon the next and final conveyer E', the baskets being so set that all apples of a maximum size will be deposited within the bin E. After passing beyond the successive rails the gage rings drop upon the baskets as shown in Fig. 3. As the baskets however approach the upper end of the machine the guide rails 70', and 71', are encountered so that the trunnions are again properly guided upon the successive rails. The inner rail 70', is held by means of the bracket 73', while the outer rail 71', is secured to the bracket 74'. On imparting a rotary movement to the pulley 15, the drive shaft 14, is actuated resulting in the shafts 69 and 19, being rotated. The rotation of the shaft 79 results in the shaft 37, being rotated so that the conveyer apron 39, is actuated resulting in the fruit within the receiving bin being successively dropped into the first hopper member 45. In Fig. 9, the receiving position of the hoppers is shown. The fruit first enters the hopper 45, and then the forward hopper 46, the paddle 58 being so adjusted that a single fruit will be within this forward section. As the chain 66, moves forward the studs 65, encounter the trip arm 63, as well as the trip lever 54. As the trip lever is raised the forward end of the rear hopper member 45, is tilted preventing the escape of the fruit within the rear hopper section. At the same time the forward hopper member 46, is rocked downward. In order to permit the fruit to escape however the paddle 58, must be moved forward and this is accomplished by means of the trip arm 63, this position of the instrumentalities being shown in Fig. 2. As soon as the end of the trip arm escapes over the lug 65, the spring 64, throws the arm 63, into its original position so that the paddle again enters the forward hopper. By this time the trip lever 54, has escaped over the stud 65, so that the hopper members 45 and 46, are again brought into alinement permitting another apple or other fruit to enter the forward hopper section.

From the foregoing it will be understood that only one fruit at a time is dropped into a basket. The machine is however continuously actuated so that as soon as one apple is dropped into a basket, the successive basket will be in position to receive the next fruit.

While I have shown a machine with but one set of feeding hoppers it should be understood that a plurality of hoppers could be employed each emptying into a distinct set of baskets. All these baskets, however, could be made to empty upon similar conveyers, it simply being necessary to lengthen these conveyers.

While in the above description I have adhered closely to the construction illustrated in the drawings, it will be understood that I have done so only for the sake of clearness and that I regard the invention as susceptible of embodiment in many widely different forms. The appended claims indicate the scope of the invention and it is considered unnecessary to catalogue equivalents at each step of the description.

Having thus described my said invention, what I claim as new and desire to secure by United States Letters Patent is:

1. The combination with a suitable supporting frame, of two suitably supported chains mounted on said frame in parallel spaced relation, a plurality of fruit holders having supports secured to said chains, a plurality of sector shaped fingers pivotally carried by each support, guide pins extending from each support, a gage ring slidably held upon said pins below each support each gage ring having slotted trunnions, said fingers resting upon said gage rings, and two successive rails held in parallel spaced relation including a series of sections of progressively greater distance from the planes of the first sections, said slotted trunnions engaging said successive rails.

2. The combination with a suitable supporting frame including two parallel longitudinal frame bars, of a flexible endless carrier arranged to move along said frame bars, a plurality of fruit holders on said endless carrier having supports, a plurality of circularly arranged fingers pivotally carried by each support, said fingers ending short of the center of the circle, a plurality of gage rings on which said fingers rest, said fruit holders and gage rings being arranged in pairs, one member of which is movable with reference to the other, means for guiding said member in said relative movement, two rails held in parallel spaced relation including a series of sections of progressively greater distance from the upper edges of said frame bars, and means carried by said movable members for engaging said successive rails.

3. The combination with a suitable supporting frame including two parallel longitudinal bars, of a flexible endless carrier arranged to move along said frame bars, a plurality of annuli on said carrier, a plurality of sector shaped fingers pivotally carried by each annulus, guide pins secured to each annulus, a gage ring slidably held upon said pins below each annulus, said fingers resting upon said gage rings, two successive rails held in parallel spaced relation including a series of sections of progressively greater distance from the upper edges of said frame bars, and means carried by said gage rings for engaging said successive rails.

4. The combination with a suitable supporting frame, of a flexible endless carrier extending lengthwise of said frame, a plurality of fruit holders each having a plurality of circularly arranged pivoted fingers, guide pins extending from each fruit holder, a gage ring slidably held upon said pins below each fruit holder each gage ring having two projections, said fingers resting upon said gage rings, two successive rails held in parallel spaced relation, each including a series of sections of progressively greater distance from the planes of the first sections said projections engaging said successive rails, and guide flanges secured at one end of said successive rails arranged to guide said projections upon said successive rails.

5. The combination with a suitable supporting frame, of a shaft secured to each end of said frame, two chain sprockets secured to each shaft, two chains passing from said sprockets, in parallel spaced relation, a plurality of fruit holders secured to said chains, a plurality of downwardly and inwardly extending fingers pivotally carried by each fruit holder, guide pins extending from each fruit holder, a gage ring slidably held upon said pins below each fruit holder each gage ring having two slotted trunnions, said fingers resting upon said gage rings, and two successive rails held in parallel spaced relation each including a series of sections of progressively greater distance from the planes of the first sections, said slotted trunnions engaging said successive rails.

6. The combination with a suitable supporting frame, of a shaft secured to each end of said frame, pulleys secured to said shafts, a flexible endless carrier passing over said pulleys and extending lengthwise of the machine, a plurality of fruit holders on said carrier each having a support, a plurality of circularly arranged fingers pivotally carried by each support, gage rings for said holders, said fingers resting upon said gage rings, means to actuate said shafts, and means for progressively altering the relative position of said holders and their corresponding gages.

7. The combination with a suitable supporting frame including two horizontal frame bars held in parallel spaced relation, of two shafts secured to said frame below said frame bars, pulleys upon said shafts, an endless carrier passing over said pulleys, a fruit holder on said carrier having a support, a plurality of sector shaped fingers pivotally carried by said support in circular relation, gage rings corresponding to said fruit holders, said fingers at times resting upon said gage ring, and corresponding gage rings and fruit holders being arranged in pairs and having co-acting guiding means, and two successive rails held in parallel spaced relation each including a series of sections of progressively greater distance from the upper edges of said frame bars, one of the members of said pairs engaging said successive rails to give progressive relative movement to the members of said pairs.

8. The combination with a suitable supporting frame including two horizontal frame bars held in parallel spaced relation, of two shafts secured to said frame below said frame bars, chain sprockets upon each shaft, two endless chains passing over said sprockets and held in parallel spaced relation, an annulus having two oppositely directed arms secured to said chains, a plurality of sector-shaped fingers pivotally carried by said annulus, guide pins extending from said annulus, a gage ring slidably held upon said pins said gage ring having two oppositely directed trunnions, said fingers at times resting upon said gage ring, two successive rails held in parallel spaced relation each including a series of sections of progressively greater distance from the upper edges of said frame bars, said trunnions engaging said successive rails, and means to adjustably support said successive rails.

9. The combination with a suitable supporting frame including two horizontal frame bars held in parallel spaced relation, of two shafts secured to said frame below said frame bars, chain sprockets upon each shaft, two endless chains passing over said sprockets and held in parallel spaced relation, an annulus having two oppositely directed arms secured to said chains, a plurality of sector-shaped fingers pivotally carried by said annulus, guide pins extending from said annulus, a gage ring slidably held upon said pins said gage ring having two oppositely directed trunnions, said fingers at times resting upon said gage ring, two successive rails held in parallel spaced relation each including a series of sections of progressively greater distance from the upper edges of said frame bars said slotted trunnions engaging said successive rails, means to adjustably support said successive rails, and guide flanges secured proximal to one end of said successive rails to guide said trunnions upon said successive rails.

10. A fruit sorting mechanism including a traveling annulus, a plurality of fingers pivotally carried by said annulus, a means to successively spread said fingers, two successive rails each comprising a series of sections at progressively greater distances from a predetermined point, the plane of the first section, and means controlled by said successive rails for enlarging the escape opening of said baskets.

11. The combination with a support, of a bail carried by said support, a plurality of sector shaped fingers pivotally secured to said bail each finger having an outstanding rib, two guide pins carried by said support, a gage ring upon said guide pins contacting with said ribs, and means to successively lower said gage ring.

12. The combination with a flexible endless carrier, of two suitably supported rails secured in parallel spaced relation each including a series of sections of progressively greater distance from the plane of the first section, a plurality of annuli secured to said carrier, two oppositely positioned guide pins secured to each annulus, a movable gage ring guided by each set of pins, each gage ring having a projection engaging said successive rails, and a plurality of sector shaped fingers pivotally secured to the inner edge of each annulus, said fingers resting upon said ring.

13. A fruit grading machine including a movable supporting member, a plurality of depending fruit cups having yielding sectional walls carried thereby and cup adjusting means disposed in coöperative relation with said cups and successively controlling the progressive opening movement of said cups.

14. A fruit grading machine, including a horizontally disposed movable member, a plurality of depending sectional fruit cups carried thereby, and means disposed below and in coactive relation with the cups for permitting successively the opening and the closing of the cups.

15. A fruit grading machine, including a horizontally disposed rotating member, a plurality of gravity opening sectional fruit cups carried thereby, and means disposed below and in coactive relation with the cups for permitting successively the opening and the closing of the cups.

16. A fruit grading machine, including a horizontally disposed rotating member, a plurality of gravity opening sectional fruit cups carried thereby, and a pair of spaced rails disposed below and in coöperation with the cups to actuate the sections thereof.

17. A fruit grader comprising in combination, a series of bins arranged side by side, individual fruit holding bags or pockets open at the top and having automatically variable outlets at the bottom, gages for said individual fruit holding bags or pockets, said individual fruit holding bags or pockets and gages being arranged in pairs, means for moving said individual fruit holding bags or pockets and gages over said bins from the head to the foot of the grader, and means for imparting relative bodily movement to the members of said pairs to vary said outlets.

18. A fruit grader comprising in combination, a series of bins arranged side by side, individual fruit holders having variable outlets, means for supporting said individual fruit holders, a gage inclosing each individual fruit holder and determining the size of its outlet, means for simultaneously moving said individual fruit holders and said gages over said bins from the head to the foot of the grader, and cam operated means for producing relative bodily movement between each gage and its holder.

19. A fruit grader comprising in combination, a series of bins arranged side by side, individual fruit holders having variable outlets, gages for said fruit holders movable therewith, said fruit holders and gages being arranged in pairs one member of each of which carries guiding means for the other, means for moving said holders and gages over said bins from the head to the foot of the grader, and means for producing relative bodily movement between the members of said pairs during their joint movement to vary said outlets.

20. A fruit grader comprising in combination, a series of bins arranged side by side, upright individual fruit holders having variable outlets, gages for said upright fruit holders movable therewith, said fruit holders and gages being arranged in pairs one member of each of which carries guiding means for the other, means for moving said holders and gages over said bins from the head to the foot of the grader, and means for producing relative up and down bodily movement between the members of said pairs during their joint movement to vary said outlets.

21. A fruit grader comprising in combination, a series of bins arranged side by side, individual fruit holders having a series of freely depending hinged sections, gages determining the position of said sections and movable with said individual fruit holders, said fruit holders and gages being arranged in pairs one member of each pair having supports and the other guiding sleeves therefor, means for moving said holders and gages over the bins from the head to the foot of the grader, and means for producing bodily movement between the members of said pairs during their joint movement.

22. A fruit grader comprising in combination, a series of bins arranged side by side, gages having gage holes, individual fruit holders having movable sections depending through said gage holes and contacting with the edges thereof, means for moving said gages with said fruit holders over said bins from the head to the foot of the grader, and automatic means for producing relative bodily movement between individual gages and the corresponding holders as they pass over successive bins.

23. A fruit grader comprising in combination, a series of bins arranged side by side, gages having round gage holes of uniform size, individual fruit holders having movable sections depending through said gage holes and contacting with the edges thereof, said gages and individual fruit holders being arranged in pairs, means for moving said gages with said fruit holders over said bins from the head to the foot of the grader, and automatic means for producing relative bodily movement between the members of said pairs during their joint movement.

24. A fruit grader comprising in combination, a series of bins arranged side by side, upright individual fruit holders each having a top ring and a series of depending inwardly projecting sections hinged thereto and overbalanced outwardly so as to move outwardly when free to do so, a gage for each of said individual fruit holders having a gage hole of less diameter than said top ring, inclosing said depending sections and having its edge in contact therewith, means for simultaneously moving said individual fruit holders and gages over said bins from the head to the foot of the grader, and cam means for imparting relative bodily up and down movement to a gage and its holder during their joint movement to permit the regulated enlargement of the outlets of the fruit holders by gravity.

25. A fruit grader comprising in combination, a series of bins arranged side by side, gages having round gage holes of uniform size, individual fruit holders having top rings and a series of sections hinged to said rings extending inwardly and depending freely through said holes and contacting with the edges thereof, said gages and individual fruit holders being arranged in pairs, means for simultaneously moving said gages and holders over successive bins from the head to the foot of the grader, and a cam track coöperating with a member of each pair for producing relative bodily up and down movement between the members thereof to vary the size of the outlets of the holders during the simultaneous movement of said gages and holders.

26. A fruit grader comprising in combination, a series of bins arranged side by side, upright individual fruit holders having a series of depending inwardly projecting sections hinged at the top of the holder but otherwise free therefrom and overbalanced outwardly so as to move outwardly when free to do so, a gage for each of said individual fruit holders inclosing said depending inwardly projecting sections and in contact therewith, said fruit holders and gages thus being arranged in pairs, means for simultaneously moving said individual fruit holders and gages over said bins from the head to the foot of the grader, and a cam track coacting with one member of each pair for raising and lowering it during the joint movement of said pairs to permit the regulated enlargement of the outlets of the fruit holders by gravity.

27. A fruit grader comprising in combination, a series of bins, upright fruit holders each having a series of depending inwardly projecting sections hinged at the top of the holder but otherwise free therefrom and overbalanced outwardly so as to move outwardly when free to do so, means for controlling the outlets of said holder inclosing and in contact with said depending inwardly projecting sections, means for simultaneously moving said individual fruit holders and gages over said bins from the head to the foot of the grader, and cam means for producing relative movement between said holder and its outlet controlling means during their joint movement over the bins to permit the regulated enlargement of the outlets of the fruit holders by gravity.

28. A fruit grader comprising in combination, a series of bins, individual fruit holders through which the fruit may pass having outlets and inlets separate therefrom, means associated with each fruit holder for controlling its outlet, means for moving said fruit holders with their outlet controlling means over said bins from the head to the foot of the grader, and stationary cams for producing relative bodily movement at an angle to the plane of the outlet between a fruit holder and its outlet controlling means.

29. An individual fruit holder for fruit graders having a top ring and a series of depending inwardly extending sections hinged thereto but otherwise free and overbalanced outwardly.

30. In a fruit grading machine a revolving support having a longitudinal series of pockets yieldingly swung therefrom, each pocket comprising a plurality of downwardly converging walls.

31. In a fruit grading machine a support having an orbital motion and having a series of pockets yieldingly swung therefrom, each pocket comprising a plurality of downwardly converging expansible walls.

32. In a fruit grading machine a carrier having a series of pockets and a sectional vertically adjustable guide rail effective to progressively open said pockets as they are carried past.

33. In a fruit grading machine, an endless carrier having a series of pockets and a sectional guide rail having its sections vertically adjustable and disposed in stepped relation whereby said pockets are progressively opened as they are carried past said sections.

34. A fruit grader comprising individual fruit holding bags or pockets open at the top and having automatically variable outlets at the bottom, gages for said individual fruit holding bags or pockets, said individual fruit holding bags or pockets and gages being arranged in pairs, means for moving said individual fruit holding bags or pockets and gages together in one direction, and means for imparting relative bodily movement to the members of said pairs to vary said outlets.

35. A fruit grader comprising individual fruit holders having variable outlets, means for supporting said individual fruit holders, a gage inclosing each individual fruit holder and determining the size of its outlet, means for simultaneously moving said individual fruit holders and said gages together in one direction, and cam operated means for producing relative bodily movement between each gage and its holder.

36. A fruit grader comprising individual fruit holders having variable outlets, gages for said fruit holders movable therewith; said fruit holders and gages being arranged in pairs, one member of each of which carries guiding means for the other, means for moving said holders and gages together in one direction, and means for producing relative bodily movement between the members of said pairs during the joint movement to vary said outlets.

37. A fruit grader comprising upright individual fruit holders having variable outlets, gages for said upright fruit holders movable therewith, said fruit holders and gages being arranged in pairs one member of each of which carries guiding means for the other, means for moving said holders and gages together in one direction, and means for producing relative up and down bodily movement between the members of said pairs during their joint movement to vary said outlets.

38. A fruit grader comprising individual fruit holders having a series of freely depending hinged sections, gages determining the position of said sections and movable with said individual fruit holders, said fruit holders and gages being arranged in pairs one member of each pair having supports and the other guiding sleeve therefor, means for moving said holders and gages together in one direction, and means for producing bodily movement between the members of said pairs during their joint movement.

39. A fruit grader comprising gages having gage holes, individual fruit holders having movable sections depending through said gage holes and contacting with the edges thereof, means for moving said gages with said fruit holders together in one direction, and automatic means for producing relative bodily movement between individual gages and the corresponding holders as they move together in one direction.

40. A fruit grader comprising gages having round gage holes of uniform size, individual fruit holders having movable sections depending through said gage holes and contacting with the edges thereof, said gages and individual fruit holders being arranged in pairs, means for moving said gages with said fruit holders together in one direction, and automatic means for producing relative bodily movement between the members of said pairs during their joint movement.

41. A fruit grader comprising upright individual fruit holders each having a top ring and a series of depending inwardly projecting sections hinged thereto and overbalanced outwardly so as to move outwardly when free to do so, a gage for each of said individual fruit holders having a gage hole of less diameter than said top ring, inclosing said depending sections and having its edge in contact therewith, means for simultaneously moving said individual fruit holders and gages together in one direction, and cam means for imparting relative bodily up and down movement to a gage and its holder during their joint movement to permit the regulated enlargement of the outlets of the fruit holders by gravity.

42. A fruit grader comprising gages having round gage holes of uniform size, individual fruit holders having top rings and a series of sections hinged to said rings extending inwardly and depending freely through said holes and contacting with the edges thereof, said gages and individual fruit holders being arranged in pairs, means for simultaneously moving said gages and holders from the head to the foot of the grader, and a cam track coöperating with a member of each pair for producing relative bodily up and down movement between the members thereof, to vary the size of the outlets of the holders during the simultaneous movement of said gages and holders.

43. A fruit grader comprising upright individual fruit holders having a series of depending inwardly projecting sections hinged at the top of the holder but otherwise free therefrom and overbalanced outwardly so as to move outwardly when free to do so, a gage for each of said individual fruit holders inclosing said depending inwardly projecting sections and in contact therewith, said fruit holders and gages thus being arranged in pairs, means for simultaneously moving said individual fruit holders and gages from the head to the foot of the grader, and a cam track coacting with one member of each pair for raising and lowering it during the joint movement of said pairs to permit the regulated enlargement of the outlets of the fruit holders by gravity.

44. A fruit grader comprising upright fruit holders each having a series of depending inwardly projecting sections hinged at the top of the holder but otherwise free therefrom and overbalanced outwardly so as to move outwardly when free to do so, means for controlling the outlets of said holder inclosing and in contact with said depending inwardly projecting sections, means for simultaneously moving said individual fruit holders and gages from the head to the foot of the grader, and cam means for producing relative movement between said holder and its outlet controlling means during their joint movement to permit the regulated enlargement of the outlets of the fruit holders by gravity.

45. A fruit grader comprising a series of individual fruit holders through which the fruit may pass having outlets and inlets separate therefrom, means associated with each fruit holder for controlling its outlet, means for moving said fruit holders with their outlet controlling means from the head to the foot of the grader, and stationary cams for producing relative bodily movement at an angle to the plane of the outlet between a fruit holder and its outlet controlling means.

46. A fruit grader comprising in combination, a support, individual fruit holding pockets having depending inwardly and outwardly movable sections, means for giving travel to said support and fruit holding pockets, devices inclosing and co-acting with said sections, and cams acting upon said inclosing means to determine the position of said movable sections.

47. A fruit grader comprising in combination, a series of bins, a support, individual fruit holding pockets carried by said support and having depending inwardly and outwardly movable sections providing variable outlets for said holding pockets, means for moving said support and holding pockets over said bins, and means for determining the size of said outlets.

48. A fruit grader comprising a fruit holder having a support and a plurality of circularly arranged depending inwardly extending fingers yieldingly secured to said support, and means for giving controlled movement to the lower ends of said fingers toward and away from each other.

49. A fruit grader comprising a fruit holder having a support and a plurality of circularly arranged depending inwardly extending fingers hinged to said support, a gage adapted for co-action with said fingers, and means for giving relative up and down movement to said holder and gage.

50. A fruit grader comprising a flexible endless carrier, individual fruit holders thereon, said fruit holders having a support and a plurality of circularly arranged depending inwardly extending fingers yieldingly secured to said support, and means for giving controlled movement to the lower ends of said fingers toward and away from each other.

51. A fruit grader comprising a flexible endless carrier extending lengthwise of the grader, individual fruit holders mounted thereon, said fruit holders having a plurality of circularly arranged depending inwardly extending fingers hinged to said support, a gage inclosing the fingers of each holder, means for causing the carrier to move with said holders and gages in the direction of its length, and means for giving relative up and down movement to said holders and gages during their joint movement.

52. A fruit holder for use in machines of the character described comprising an apertured support, a plurality of depending fingers movably mounted at the edge of the aperture, and means for controlling the movement of the lower ends of said fingers toward and away from one another to vary the size of the outlet formed by the said fingers.

53. A fruit holder for use in machines of the character described comprising a support having a circular aperture therein, depending fingers having their upper ends movably secured to said support at the edge of the aperture, a gage normally held in raised position and adapted to co-act with said fingers causing them to converge, and means for moving said gage downward to permit said fingers to move away from one another.

54. A fruit holder for use in machines of the character described comprising a support having a circular aperture therethrough, depending fingers movably secured at their upper ends about the edge of said aperture, cam surfaces formed on the backs of said arms, and a vertically movable gage apertured to receive the free ends of said fingers and adapted to co-act with said cam surfaces.

55. A fruit holder of inverted truncated conical form, having a support and a plurality of depending inwardly extending arms hinged thereto but otherwise free and overbalanced outwardly, and a gage coöperating with said arms to determine their position.

56. A fruit grader comprising in combination, a movable support, fruit holders thereon having depending sections, and gages coöperating with said fruit holders, said gages and holders secured together in pairs between the members of which relative movement is possible, said gages being detachable for ready interchangeability with gages of other sizes.

57. A fruit grader comprising in combination, fruit grading devices, and a plurality of parallel conveyers extending transversely beneath said fruit grading devices, one of said conveyers being longer than the conveyer on each side of it, each of said conveyers corresponding to one grade, and located beneath the devices permitting fruit of that grade to pass to the conveyer.

58. A fruit grader comprising in combination, fruit grading devices, and a plurality of parallel conveyers extending transversely beneath said fruit grading devices, one of said conveyers being longer than the rest and the conveyers on each side of it successively decreasing in length, each of said conveyers corresponding to one grade and located beneath the devices permitting fruit of that grade to pass to the conveyer.

59. A fruit grader comprising in combination, fruit grading devices, a plurality of parallel conveyers extending transversely beneath said fruit grading devices, one of said conveyers being longer than the rest and the conveyers on each side of it successively decreasing in length, each of said conveyers corresponding to one grade and located beneath the devices permitting fruit of that grade to pass to the conveyer, and a series of parallel bins corresponding to said conveyers and at right angles thereto.

In testimony whereof I affix my signature, in presence of two witnesses.

FLORENT J. PEARSON.

Witnesses:
ELMER E. DUNCAN,
HERBERT G. PEARSON.

Copies of this patent may be obtained for five cents each, by addressing the "Commissioner of Patents, Washington, D. C."